Feb. 15, 1938. W. W. ALLEN 2,108,738
TWIN-FAN STRUCTURE
Filed March 12, 1937  3 Sheets-Sheet 1
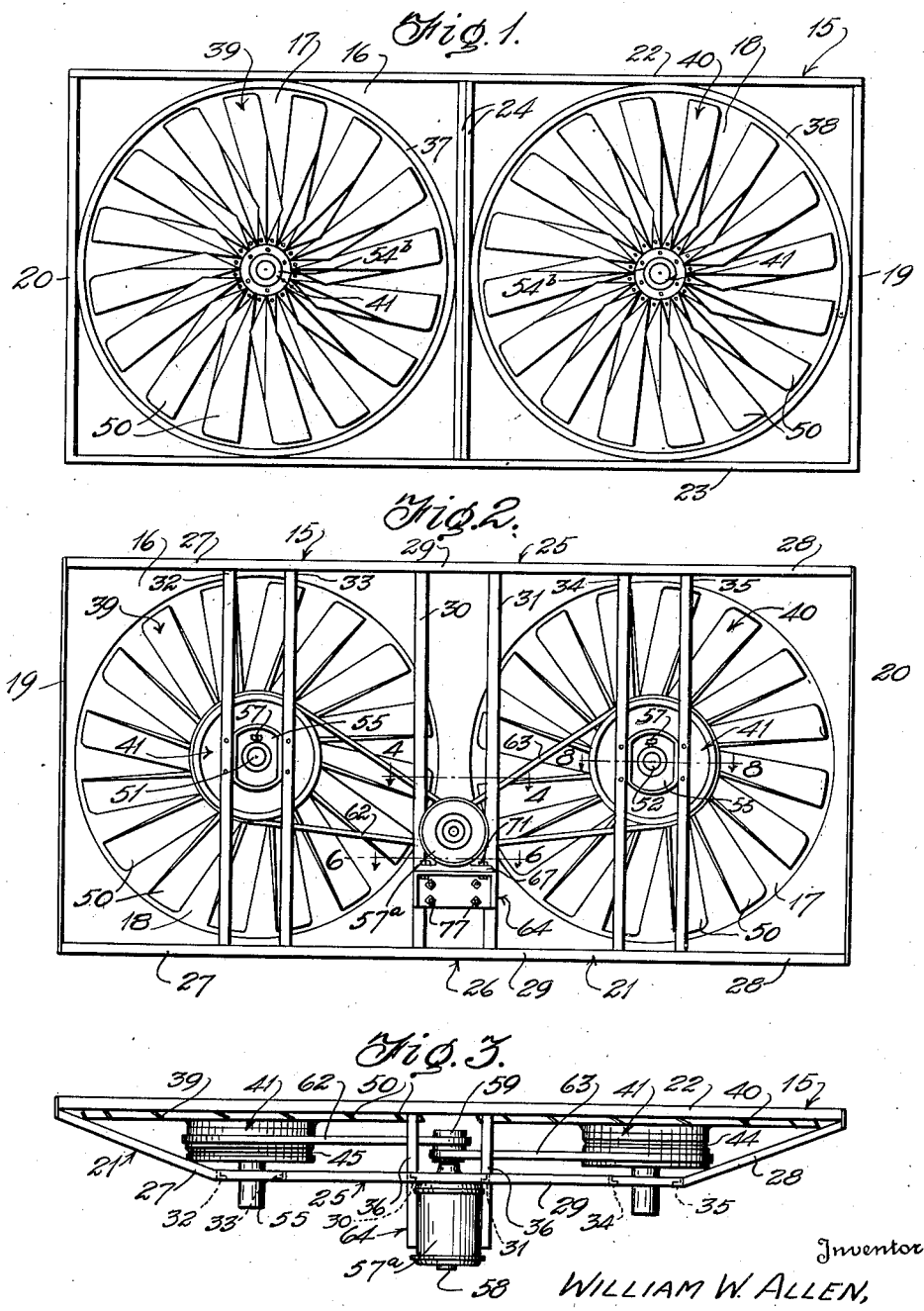
Inventor
WILLIAM W. ALLEN,
By Kimmel & Crowell
Attorneys

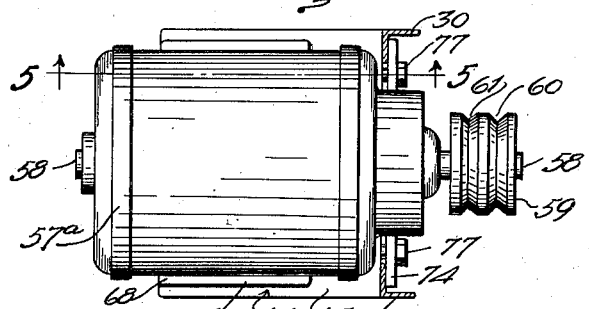
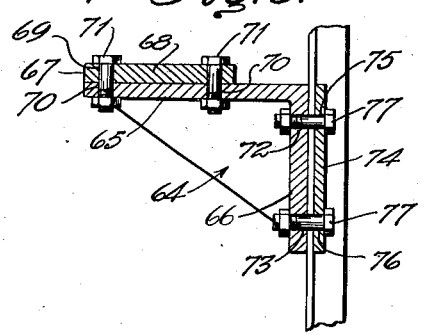
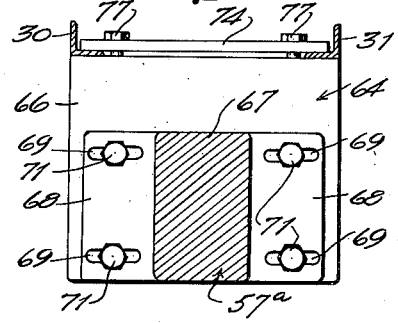
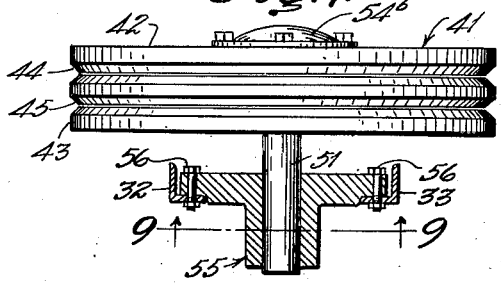
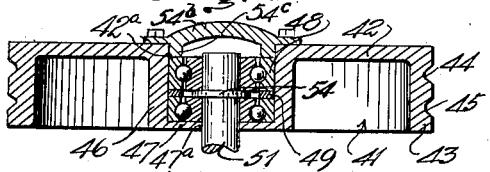
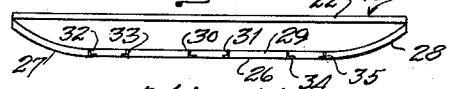
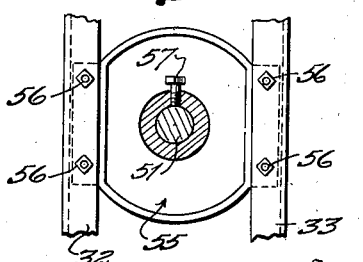

Feb. 15, 1938.  W. W. ALLEN  2,108,738
TWIN-FAN STRUCTURE
Filed March 12, 1937  3 Sheets-Sheet 3

Inventor
WILLIAM W. ALLEN,
By Kimmel & Crowell
Attorneys

Patented Feb. 15, 1938

2,108,738

UNITED STATES PATENT OFFICE 2,108,738

TWIN-FAN STRUCTURE

William W. Allen, Jacksonville, Fla.

Application March 12, 1937, Serial No. 130,563

7 Claims. (Cl. 230—273)

This invention relates to a twin-fan structure.

The invention has for its object to provide, in a manner as hereinafter set forth including a pair of sidewise opposed spaced fans operated in unison in a like direction from a single motor thereby obtaining more air per horse power than a fan of a similar size.

A further object of the invention is to provide, in a manner as hereinafter set forth, a twin-fan structure having each of its fans driven by an endless belt operated from the same motor and whereby it is possible to adjust the belt tension on either fan individually or in unison.

A further object of the invention is to provide, in a manner as hereinafter set forth, a twin-fan structure having each of its fans mounted revolubly on separate shafts, the fans being sidewise opposed, operating in the same plane and driven from a motor common thereto, which is different from most twin fans now in general use in that they operate on a common shaft driven from a single motor.

A further object of the invention is to provide, in a manner as hereinafter set forth, a twin-fan structure whereby the air delivery is increased in a less vertical space than is possible with ordinary single type fans, thus giving slower speeds and less noise.

A further object of the invention is to provide, in a manner as hereinafter set forth, a twin-fan structure having each of its fans revolubly mounted on an independent shaft, a separate belt transmission for each fan, a driving motor for and common to the belts, and with the motor adjustably connected to an adjustable mounting whereby the adjusting of tension of the belts on said fans may be had separately or in unison.

A further object of the invention is to provide, in a manner as hereinafter set forth, a twin-fan structure arranged to conserve vertical space which is an important feature when installing a fan in a home or other building with a low attic and whereby the structure may be installed horizontally in a narrow hall which would be impossible to accomplish with a larger type fan to obtain the same amount of air desired.

A further object of the invention is to provide, in a manner as hereinafter set forth, a twin-fan structure having a pair of automatically opening and closing shutters associated with the fans of the structure.

Further objects of the invention are to provide, in a manner as hereinafter set forth, a twin-fan structure which is simple in its construction and arrangement, strong, durable, compact, thoroughly efficient in its use, readily assembled, comparatively inexpensive to manufacture and conveniently repaired when occasion requires.

With the foregoing and other objects which may hereinafter appear, the invention consists of the novel construction, combination and arrangement of parts as will be more specifically set forth and illustrated in the accompanying drawings wherein is shown embodiments of the invention, but it is to be understood that changes, variations and modifications may be resorted to which fall within the scope of the invention as claimed.

In the drawings:

Figure 1 is a front elevation of a twin-fan structure in accordance with this invention, Figure 2 is a rear elevation thereof, Figure 3 is a top plan view, Figure 4 is a section upon an enlarged scale, on line 4—4, Figure 2, Figure 5 is a section on line 5—5, Figure 4, Figure 6 is a section, upon an enlarged scale, on line 4—4, Figure 2, Figure 7 is a top plan view showing the form of hub of each fan and the supporting shaft for the fan.

Figure 8 is a diametrical section on line 8—8, Figure 2,

Figure 9 is a section on line 9—9, Figure 7,

Figure 10 is a top plan view of the housing for the fans,

Figure 11 is a top plan view of a modified form of housing for the fans,

Figure 12:
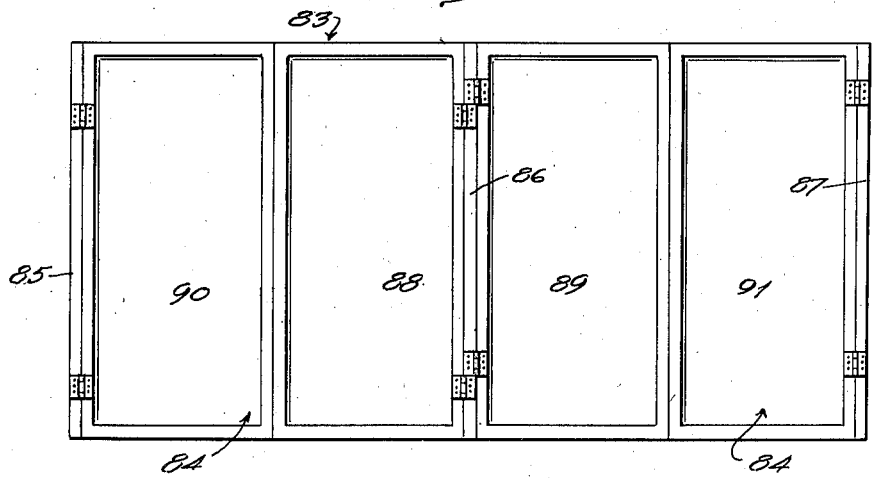
Figure 12 is a front elevation of a modified form of twin-fan structure.

Referring to the Figures 1 to 11, the twin-fan structure includes a rectangular housing 15 of frame-like form having a front plate 16 formed with a pair of openings 17, 18, a pair of side members 19, 20, an open frame-like back 21, a top bar 22, a bottom bar 23 and a pair of abutting vertically disposed centrally arranged brace bars 24 interposed between the top and bottom bars 22, 23 respectively and anchored to the outer face of the front plate 16. The latter is arranged between the side members 19, 20, top bar 22 and bottom bar 23. The members 19, 20 extend rearwardly from plate 16 and bars 22, 23. The bars 22, 23 extend forwardly and rearwardly from the plate 16. The back 21 includes aligned top and bottom bars 25, 26 respectively of like form and each of which includes a pair of forwardly extending oppositely outwardly inclined end stretches 27, 28 and an intermediate stretch 29. The forward ends of the stretches 27, 28 of the bars 25, 26 are anchored to the inner faces of the side members 19, 20. The bars 25, 26 are of angle shape cross section and are oppositely disposed. Secured at their upper and lower ends to the forward faces of the vertical flanges of the stretches 29 of the bars 25, 26 is a pair of spaced parallel vertically extending oppositely disposed combined bracing and supporting elements 30, 31 of angle shape cross section arranged adjacent to and on opposite sides of the vertical median of housing 15 and which constitute an inner set of combined bracing and supporting elements. Secured at their upper ends and lower ends to the forward faces of the vertical flanges of the stretches 27 of the bars 25, 26 is a pair of spaced parallel vertically extending oppositely disposed combined bracing and supporting elements 32, 33 of angle shape cross section arranged adjacent to and on opposite sides of the vertical medians of the stretches 27 and which constitute an outer set of combined bracing and supporting elements. Secured at their upper and lower ends to the forward faces of the vertical flanges of the stretches 28 of the bars 25, 26 is a pair of spaced parallel vertically extending oppositely disposed combined bracing and supporting elements 34, 35 of angle shape cross section, arranged adjacent to and on opposite sides of the vertical medians of the stretches 28 and which constitute another outer set of combined bracing and supporting elements. Rearwardly extending spaced parallel brace members 36 are interposed between the top bar 22 and the intermediate stretch 29 of the bar 25. The ends of the members 36 are anchored to bars 22 and 25. The plate 16 has secured to its forward face a pair of circular members 37, 38 for reinforcing the edges of the openings 17, 18 respectively.

The structure includes a pair of spaced sidewise aligned fan elements 39, 40 of like form, each including an annular hub 41 (Figures 7 and 8) having a front part 42 in the form of a circular disc provided with an enlarged axial opening 42ª, a rearwardly extending annular rim 43 merging at its forward end into and being flush with the outer edge of part 42 and provided in its outer periphery with a pair of spaced circumferentially extending V-grooves 44, 45, a rearwardly extending annular collar integral with the inner face of part 42, disposed in concentric spaced relation with respect to the rim 43, having its inner face flush with the wall of opening 42ª and being closed at its rear end as at 47. The end 47 is provided with an axial opening 47ª of less diameter than and having its axis aligning with the axis of opening 42ª.

Arranged within the collar 46 is a pair of spaced bearing structures 48, one of which seats against the forward face of the end 47 of collar 46. The spacing means for structure 48 are indicated at 49.

Each fan element includes a series of radially disposed fan blades 50 secured to the forward face of the part 42 of hub 41. The blades 50 extend into an opening 17 or 18.

There is associated with the fan elements 39, 40 a pair of supporting shafts 51, 52 respectively. The shafts 51, 52 are of like form and arranged in parallel spaced relation sidewise. Each shaft in proximity to its forward end is provided with a shoulder 54. Each shaft has its forward portion arranged in sleeve 46, extend through opening 47ª and has its shoulder 54 arranged between the bearing structure 48. Cap members 54ᵇ are anchored to the front face of the parts 42 of the hubs and are formed with inwardly extending annular flanges 54ᶜ which bear against the forward bearing structure 48.

The shaft 51 or 52 not only extends through the bearing structures 48, but also extends rearwardly from end 47 of collar 46 into a support member 55 which is arranged between and abuts the forward flanges, as well as being arranged between, abutting and anchored to the rear flanges of the pair of elements 32, 33 or to the pair of elements 34, 35. In Figures 7 and 9 the arrangement of a support member 55 is shown in connection with the elements 32, 33 and is anchored to the rear flanges of such elements as at 56. The shaft 51 or 52 is anchored stationary to a support member 55 by a binding screw 57. The hub 41 revolves about a pair of bearing structures 48 and the bearing assemblies will take care of thrust in either direction.

A driving motor common to both fan elements is indicated at 57ª. The shaft of motor 57ª is designated 58 and extends forwardly from the motor housing. The extended end of shaft 58 bodily carries therewith a drive pulley 59 formed with a pair of spaced V-grooves 60, 61 extending circumferentially of its outer periphery. There is associated with the pulley 59 a pair of oppositely extending power transmission belts 62, 63 for simultaneously operating the fan elements 39, 40. The belt 62 travels in the groove 60 of the pulley 59 and in the groove 44 of the hub 41 of the fan element 39. The belt 63 travels in the groove 61 of the pulley 59 and in the groove 45 of the hub 41 of the fan element 40.

The motor is capable of being adjustable longitudinally and vertically with respect to the housing 15 for adjusting the tension of the belts on the hubs, and for such purpose there is provided an angle-shaped bracket 64 formed of a horizontally disposed rearwardly extending upper arm 65 and a vertically disposed arm 66 depending from the forward end of the arm 65. The stand 67 of the motor 57 is formed with a pair of oppositely disposed lateral extensions 68 which seat on the arm 65. The extensions 68 are formed with slots 69 lengthwise thereof. The arm 65 is formed with openings 70 which align with the slots 69. Detachable holdfast means 71 extend through the aligning slots and openings. The slotted extensions 68 and holdfast means 71 in connection with the openings 70 permit of the adjusting of the motor in opposite directions longitudinally relative to housing 15 and for detachably securing the motor in its adjusted position. The arm 66 of bracket 64 is positioned against the rear flanges of the elements 30, 31 and it is provided with an upper pair of horizontally aligned spaced openings 72 and a lower pair of horizontally aligned spaced openings 73. The openings 72 vertically align with the openings 73. Arranged against the inner faces of the rear flanges of the elements 30, 31 is a clamping plate 74 having openings 75, 76 aligning respectively with openings 72, 73 of the arm 66. The bracket 64 is vertically adjustable relative to the housing 15 and when adjusted it carries the motor 57 in a like direction whereby the latter is vertically adjusted relative to housing 15 for increasing the tension of the belts on the hubs of the fan elements. The bracket 64 is detachably clamped in its adjusted position by holdfast means 77 coacting with the openings 72, 73, 75, 76, arms 66 and plate 74 whereby motor 57 will be held in a like position.

With reference to Figure 11, there is shown diagrammatically a fan structure 78 formed of separate fan units 79, 80 of like form which are anchored together in inner sidewise abutting relation. The backs of the units 79, 80 are connected together by an adapter 81 formed with 2,108,738 3 a pair of elements 82 which correspond to the elements 30, 31 shown in Figure 2.

Figure 13:
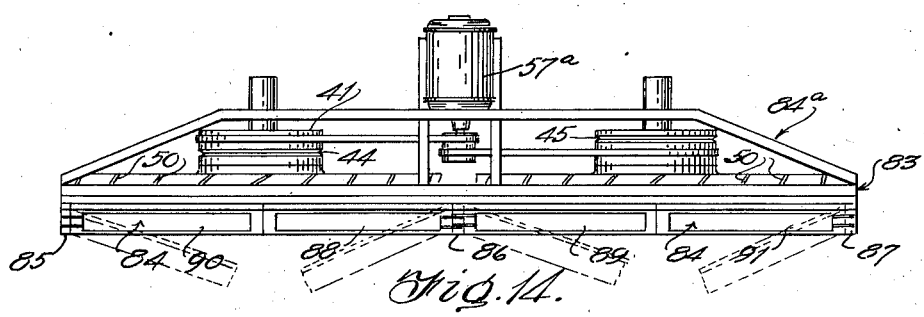
Figure 13 is a top plan view of the modified form with the shutters shown in dotted lines in open position.
Figure 14:
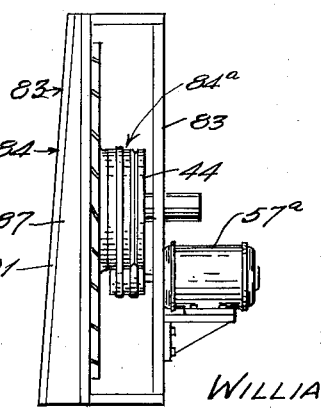
Figure 14 is a view looking towards one side of the modified form shown in Figure 12.

With reference to Figures 12, 13, and 14 they show another modified form 83 which corresponds to the form shown in Figures 1 and 2 with the addition thereto of a pair of automatically operable shutter devices 84 of like form arranged at the front of the fans. The elements of the form shown in Figures 12, 13, and 14 which are in accord with the showing of Figures 1 and 2 are generally indicated at 84ª. The front of the housing of the form 83 has secured to each end thereof and at its vertical center an upstanding bar. The bars are of like form, extend forwardly from said front and gradually increase in width from their upper to their lower ends thereby forming them with inclined forward edges. The bars correspond in height to that of the housing. The bars are indicated at 85, 86, and 87. Hinged to the bar 86 is a pair of oppositely extending shutter members 88, 89. Hinged to the bar 85 and extending towards and coacting with the shutter member 88 is shutter member 90. Hinged to the bar 87 and extending towards and coacting with the shutter member 89 is a shutter member 91. The shutter members are arranged between the bars 85, 86 and 87. Each automatically operable shutter device 83 consists of an end bar, the central bar and a pair of shutter members. The devices 84 automatically open when the fan elements are in operation and automatically close when the operation of the fan elements is discontinued to provide respectively for ventilation and to prevent draft.

What I claim is:

1. A twin-fan structure including a pair of parallel vertical fan elements arranged in sidewise disposed relation and in close proximity to each other, a stationary shaft for revolubly supporting each fan element, said shafts having their axes disposed in parallel spaced relation, a motor, a power transmitting means driven from said motor and connected to said elements for simultaneously operating them, said power transmitting means being in the form of a pair of oppositely extending endless belts, each of said fan elements including a hub engaged by a belt, supporting structure common to said motor and shafts, said fan elements arranged in the front of said structure, and said structure including coacting parts for adjusting said motor in paths at right angles for controlling the tension of the belts on said hubs.

2. In a twin-fan structure, a pair of stationary shafts having their axes disposed in sidewise parallel spaced relation, a vertical fan element revolubly supported on each shaft and being formed with a rearwardly extending hub, said elements disposed in sidewise relation and in close proximity to each other, a horizontally and vertically adjustable motor, said motor movable on said frame only in directions at right angles to each other and arranged rearwardly of said elements and having its axis intersecting the plane of and at a point between said elements, and a pair of oppositely extending endless belts driven in unison from the forward end of said motor and connected to said hubs for driving said fan elements simultaneously.

3. In a twin-fan structure, an upstanding housing having a pair of sidewise aligned openings in its front arranged in close proximity to each other, said housing being formed with a frame-like back, a fan element mounted in and extending rearwardly from each opening, a pair of independent shafts, each revolubly supporting a fan element, the back of said housing being provided with spaced horizontally aligned means for maintaining said shafts stationary, a pair of oppositely extending endless belts for operating said elements in unison, a motor common to said belts for driving them simultaneously, and the back of said housing centrally thereof being provided with a slotted plate for adjustment of said motor horizontally, said motor being also adjustable at a right angle thereto vertically, thus controlling the tension of the belts.

4. In a twin-fan structure, a housing including a front formed with a pair of sidewise disposed openings arranged in close proximity to each other, a pair of fan elements, each arranged in and extending rearwardly of an opening, a motor supported by the back of the housing rearwardly of and at a point extending between said fan elements, a pair of oppositely extending belts operated in unison by the motor and connected to and for driving said elements simultaneously, and said back of said housing centrally thereof having supports on which the motor is adjustable only in paths at right angles to each other for controlling the tension of said belts.

5. In a twin-fan, a supporting structure including a front and frame-like back, said front being formed with a pair of sidewise disposed closely related openings, said back being formed with a pair of outer sets and an inner set of combined bracing and supporting elements, said sets being disposed in spaced relation, a support between and fixed to the elements of each outer set, a pair of stationary shafts, each having its rear end fixed to a support, a fan element arranged in each of said openings and revolubly mounted on one of said shafts, a motor, oppositely disposed belt transmissions driven from the motor for simultaneously operating said fans, and means for adjusting the motor vertically on said inner supports and adjusting the motor at right angles thereto to control the tension of said transmissions with the elements of said inner set for supporting the motor and for vertically and horizontally adjusting the motor to provide for controlling the tension of said transmissions.

6. The invention as set forth in claim 5 having each of said fan elements formed with a rearwardly extending annular hub engageable by a transmission and provided therein with a collar, spaced bearing structures within said collar encompassing a portion of a shaft, means for confining the bearing structures in the collar, and each shaft having peripheral means extending between the bearing structures within a collar.

7. In a twin-fan, a housing including a front and a framelike back, said front being formed with a pair of sidewise disposed closely related openings, said back being formed with a pair of spaced aligned supports, a pair of stationary shafts anchored at their rear to said supports and extended forwardly therefrom, fan elements arranged within and extending rearwardly from said openings, said elements being revolubly confined on said shafts, a motor, oppositely disposed belt transmissions driven from the motor for driving said elements, and said back provided with means for supporting the motor and for vertically adjusting the motor on the supports and horizontally at right angles thereto for controlling the tension of said transmissions.

WILLIAM W. ALLEN.